United States Patent [19]

Cipriano et al.

[11] Patent Number: 4,589,963
[45] Date of Patent: May 20, 1986

[54] PROCESS FOR THE CONVERSION OF SALTS OF CARBOXYLIC ACID TO THEIR CORRESPONDING FREE ACIDS

[75] Inventors: Robert A. Cipriano; Bobby R. Ezzell, both of Lake Jackson, Tex.

[73] Assignee: The Dow Chemical Company, Midland, Mich.

[21] Appl. No.: 679,339

[22] Filed: Dec. 7, 1984

[51] Int. Cl.[4] ............................................. C25B 3/00
[52] U.S. Cl. .................................... 204/72; 204/182.6
[58] Field of Search ................. 204/72, 180 P, 182.6

[56] References Cited

U.S. PATENT DOCUMENTS 3,330,749 7/1967 Kuwata ........................... 204/180 P
3,964,985 6/1976 Giuffrida ......................... 204/180 P
4,454,012 6/1984 Bachot .................................. 204/72

Primary Examiner—John F. Niebling
Assistant Examiner—W. T. Leader
Attorney, Agent, or Firm—Glwynn R. Baker

[57] ABSTRACT

There is described a process for converting salts of monobasic amino acids to their free acids by treatment under electrolytic methods wherein electrical power requirements are reduced, contamination of the electrolytes with undesired products of the electrolysis is substantially reduced, stronger concentrations of basic electrolyte is produced and utilized in the process by employing substantially permselective membranes having sulfonic and/or carboxylic functionality.

8 Claims, 7 Drawing Figures

PROCESS FOR THE CONVERSION OF SALTS OF CARBOXYLIC ACID TO THEIR CORRESPONDING FREE ACIDS

BACKGROUND OF THE INVENTION

Glycine and α- and β-alanine are usually prepared by the reaction of ammonia with the respective hydroxy nitrile or acrylonitrile, to form the amino nitrile, then reacted with strong alkali to convert the cyanide moiety to the carboxylic acid salt of the alkali.

Typically, glycine, α-alanine and β-alanine are recovered in their pure form by multiple extraction processes like that taught in U.S. Pat. No. 3,985,801. The patent teaches recovery of glycine from an aqueous solution of glycine and sodium chloride. The steps involved are: (1) adjusting the pH of the starting solution to 4.85–8.5 and evaporating water therefrom and cooling to precipitate glycine and to form a first mother liquor, (2) separating the precipitated glycine from the first mother liquor, and (3) recovering the separated glycine. In all, nine repetitive cycles are required to obtain 88.5% glycine recovery. In a similar patent (U.S. Pat. No. 3,947,496) also issued to W. R. Grace and Company, sulfuric acid is substituted for hydrochloric acid. Eleven repetitive cycles are required to obtain 86% glycine and 84% $Na_2SO_4$ recovery. U.S. Pat. No. 3,813,434, also issued to W. R. Grace and Company, teaches removal of iminodiacetic acid as an impurity in the glycine stream. Removal is accomplished by utilization of an anion exchange resin which retains the iminodiacetic acid component, thereby leaving a purified glycine solution.

These processes involve the production of salts and subsequently various waste streams.

Japanese Pat. No. 118,047 teaches utilization of either a three or four compartment cell similar to the one described in the present invention. Part of the technology taught in this patent is the addition of a portion of the anolyte (1N $H_2SO_4$) to the middle stream (glycinate/glycine) in order to maintain conductivity in that stream. This addition results in the undesirable introduction of sulfate to the product stream, which eventually must be removed at additional cost. When the present invention is used, no conductivity enhancer is required to obtain 99.9% removal of sodium from the glycine stream. JP No. 118,047 further teaches that in order to reach conversions of sodium greater than 97.5%, either a four compartment cell or cation exchange bed is required. These two requirements are also unnecessary when the present invention is used. JP No. 118,047 cites an example in which sodium glycinate is converted to glycine by removal of 97.2% of the sodium charged. This is accomplished in a three compartment cell with the simultaneous production of 2N NaOH. The current density is 0.12 amp/$cm^2$ (0.77 ASI) with an average cell voltage of 7.6 volts. No further data is given, therefore efficiency values may not be computed. However, it is known as current density is increased in an electrochemical process, the cell voltage rises proportionally. It is also known that as conversion approaches 100%, the voltage typically increases exponentially. Example 1 of the present invention produced 20.0 wt % NaOH at a current density of 2.09 amp/$cm^2$ (1.5 ASI) with an average cell potential voltage of 5.68 volts.

It would be advantageous to process glycine, α- and/or β-alanine to achieve a 99+% recovery of the free acids at several times the rates of the prior art with voltage savings in the order of 1–2 volts. These advantages would result in increased capacity and less capital expenditure for the production of glycine from sodium glycinate.

The present invention utilizes a crude glycine stream and requires no extraneous additions of any kind. Not only is glycine produced, which is substantially free of glycinate, but also caustic which can be recycled to produce more glycinate.

BRIEF DESCRIPTION OF THE INVENTION

The present invention represents an improvement over known methods of converting monobasic amino acids such as glycinate, α- and β-alaninate to their respective free acids. The invention uses a three-compartment electrochemical cell. The cell is constructed by interposing two cation exchange membranes between an anode and a cathode. The membranes may be either sulfonated hydrocarbon varieties or acid functional fluorocarbon types. It is preferred that the membrane facing the cathode be of the fluorocarbon variety. The functional group may be sulfonic acid, carboxylic acid, or a combination of both sulfonic and carboxylic.

It has been discovered that essentially any degree of conversion of $Na^+$ can be obtained up to 99.9% with modest increases in cell potential. Depending on the degree of sodium removal desired, the process can be operated with almost no transfer of glycine into the catholyte. Since glycine is cathodically stable under $H_2$ evolution conditions, no loss occurs. If the caustic prepared in the catholyte is utilized to synthesize glycine, the transferred product is automatically recycled back into the center compartment. Therefore, in a closed loop synthesis, no product loss would occur. FIG. 6 gives pH versus $Na^+$ concentration for the examples shown. From this figure, the desired $Na^+$ concentration in the product stream can be predicted based on the pH observed. This enables easy, dependable process control over a wide range of $Na^+$ concentration. In addition to the correlation developed between process stream pH and $Na^+$ concentration, a similar curve of pH versus transfer of glycine has been developed. This curve is illustrated in FIG. 7. Hence, transfer of glycine can be predicted and correlated with the amount of conversion of $Na^+$ desired for the particular product stream required.

The invention includes the discovery that transport of the glycine through the membrane facing the cathode allows greater conversion of $Na^+$ than would otherwise be feasible in terms of power cost (voltage penalty). FIGS. 4 and 5 give analytical data supporting the above claim. The ability of glycine to behave as an electrolyte is surprising, principally due to the fact that transport of the glycine through a highly ionic nonporous membrane seems unlikely. It is still not understood whether zwitterion formation is the mode of transport or only the fully protonated cationic form is mobile. What has been demonstrated is an electrochemical process for producing a glycine stream with virtually any desired concentration of $Na^+$ at modest power requirements.

One anode employed in this process is platinum on a titanium support. Other metals, e.g. lead, tin, silver, antimony, iridium, ruthenium, cobalt, platinum or mixtures thereof are useful as anode materials either as is or coated on a support. Less expensive materials may also be incorporated into the electrode to reduce cost, increase stability and broaden the operating range. Cathode materials useful in the process are palladium, platinum, nickel, carbon (graphite), steel, titanium, or mixtures thereof. All of these can be used per se or coated on a suitable substrate e.g. carbon (graphite, steel, or titanium.)

The membranes suited for use in the invention are sulfonic and/or carboxylic acid-functionalized polymer membranes, e.g. styrene divinylbenzene or fluorocarbon polymer membranes.

The electrode reactions are not critical to the purpose of the amino acid conversion except that protons must be available from the anolyte. It is convenient to simply electrolyze water in both the anode and cathode. Mineral acids, preferably sulfuric, are suitable for the anolyte. The concentration may range from 0.05–99% by weight. Electrolysis of water on the cathode leads conveniently to coproduction of alkali metal hydroxide. The particular alkali metal, generally sodium, being determined by the cation of the amino acid salt fed to the center compartment. The concentration can range up to 35 or even 40% depending on the membrane. It is preferable to use membranes of the fluorocarbon type facing the cathode for concentration exceeding about 10%.

The temperature is only limited by the stability of the reactants and products formed and materials of construction. The concentration of the aminocarboxylic acid salt ranges from 0.1 wt % to about 95% by weight. Yield depends on the time of electrolysis and power consumed with yields of >99% obtainable.

Any of the several prior art cell designs may be employed but the three compartment cell is the preferred model. The cells of the present invention are preferably designed to have a very narrow intermediate compartment, measured membrane to membrane, usually about 0.7 to 3.0 millimeter but preferably less than 1.0 millimeters. The intermediate compartment is placed under a positive pressure from each of the anolyte and catholyte chambers and the membranes are maintained spaced apart by a non-reactive, non-conductive porous separator, preferably a woven or non-woven laminar mesh like scrim of for example polyethylene or polypropylene.

Neither the materials of construction nor the design configuration of the electrodes are critical. Any of the known reported prior art electrode materials suitably taught to be stable and useful for each of the anolyte and catholyte electrolytes can be satisfactorily employed.

Similarly the number of cells to make up a unit are not critical but should be of a number and size to accomodate the available power supply.

DETAILED DESCRIPTION OF THE INVENTION

Cell Description

| | |
|---|---|
| Anode | DeNora ON201 |
| Cathode | Expanded steel |
| Membranes | Two Nafion 324 cation exchange (fluorocarbon sulfonic acid functionality) |
| Cell Body | 3-compartment CPVC |
| Active electrode area | = 9 in$^2$ |
| Current density | = 1.5 amps/in$^2$ |
| | = 0.23 amps/cm$^2$ |
| Center compartment thickness | = 0.7 mm |

EXAMPLE 1

The anolyte was comprised of 2,000 cc of 5 wt % $H_2SO_4$ and was pumped through the anode chamber at 560 cc/min. The catholyte was comprised of 18.4 wt % NaOH and was pumped through the cathode chamber at 740 cc/min. The middle solution was comprised of 90.0 grams of 98% glycine (Aldrich Chemcial Company, Inc., Milwaukee Wis. Lot TD1613PD), 48.3 grams of NaOH and 760 grams of deionized water. The flow rate through the middle compartment was 720 cc/min. The voltage of the cell was adjusted to yield a current density of 1.5 amps/in$^2$.

Figure 1:
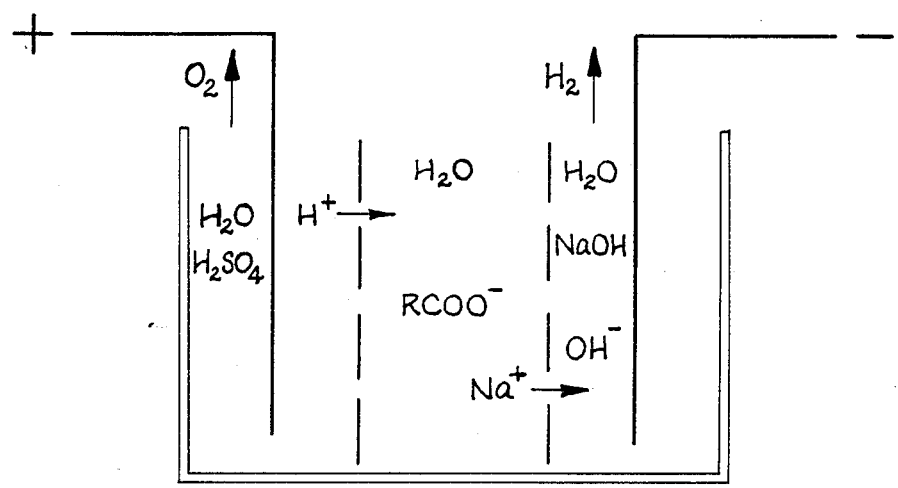
FIG. 1 illustrates the present invention in idealized form.
Figure 3:
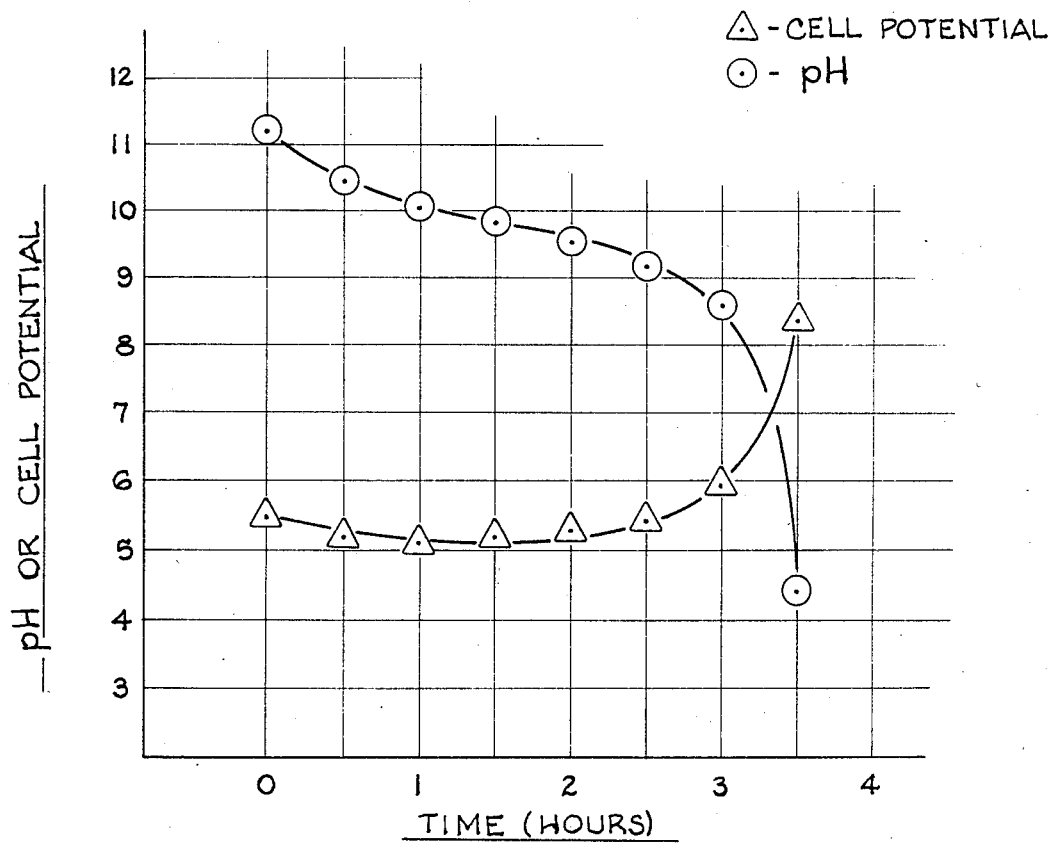
FIG. 3 illustrating the relationship between cell potential and pH as a functional of time—Example 1.
Figure 2:
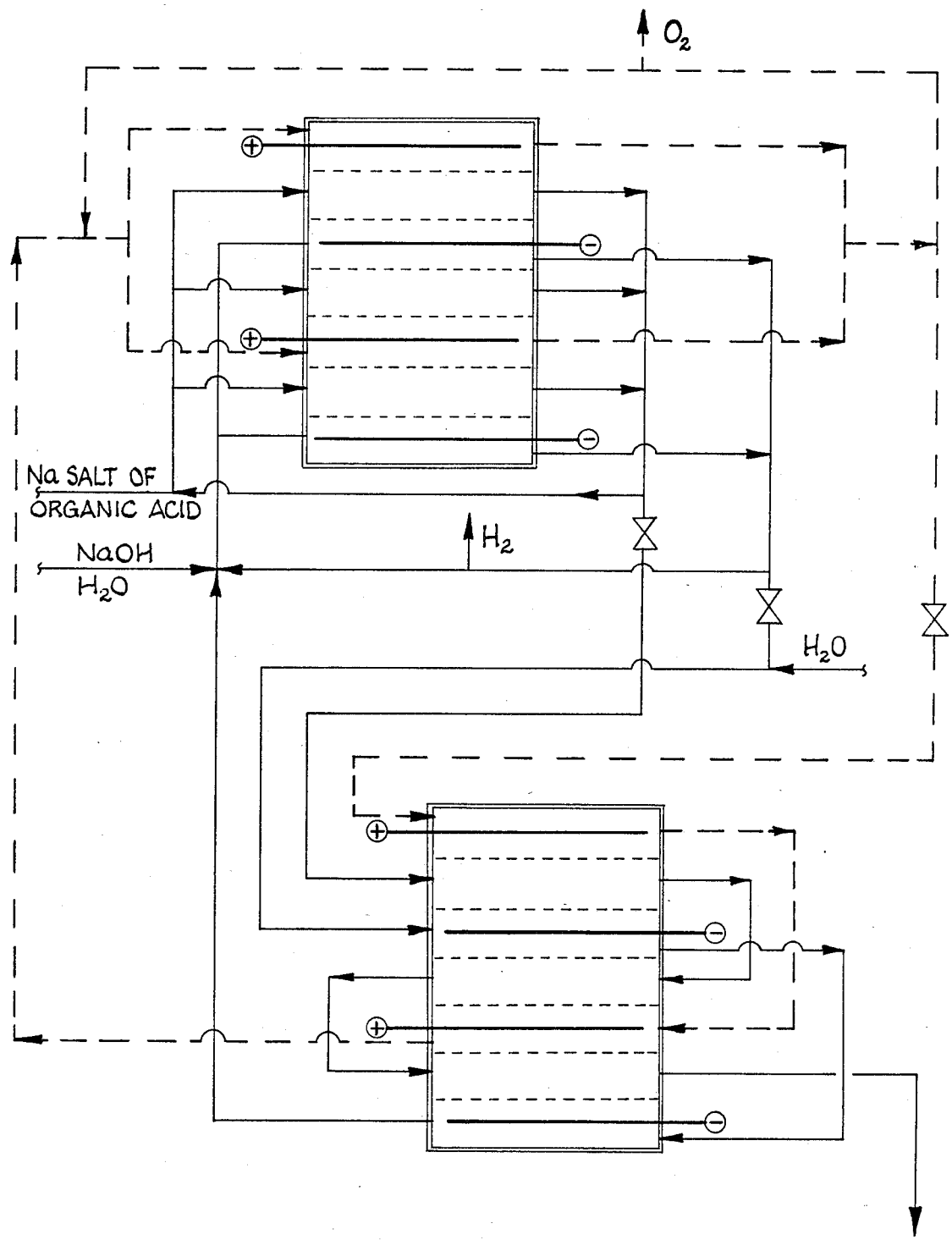
FIG. 2 illustrates typical principal conversion cell and cascading finishing cells.

Table I gives the parameters measured during the run. This data was used to generate FIG. 2 which gives the relationship between cell potential and pH as a function of time.

The pH, measured at 10 vol. % solution of the process stream in deionized water, was 4.39 in this example. This resulted in the transport of 8.95% of the charged glycine into the catholyte stream. Sodium conversion was 99.6% preparing 20.0 wt % NaOH as final catholyte.

TABLE I

| Time | Levels (cc) | | | Cell | | Flow Rates (cc/min) | | | Anode Potential | |
|---|---|---|---|---|---|---|---|---|---|---|
| hrs. | $H_2SO_4$ | NaGLYC | NaOH | Volts | Amps | $H_2SO_4$ | NaGLYC | NaOH | vs SCE | pH (10/100) |
| 0 | 1700 | 7700 | 1050 | 4.65 | 13.5 | 440 | 688 | 500 | 1.41 | 11.18 start |
| 0.5 | | | | 4.60 | " | | | | 1.47 | 10.47 |
| 1.0 | | | | 4.60 | " | | | | 1.50 | 10.01 |
| 1.5 | | | | 4.65 | " | | | | 1.51 | 9.80 |
| 2.0 | | | | 4.71 | " | | | | 1.51 | 9.47 |
| 2.5 | | | | 4.85 | " | | | | 1.52 | 8.91 |
| 3.0 | | | | 5.30 | " | | | | 1.48 | 8.17 |
| 3.166 | | | | 6.20 | " | | | | 1.48 | 7.68 |

EXAMPLE 2

Figure 4:
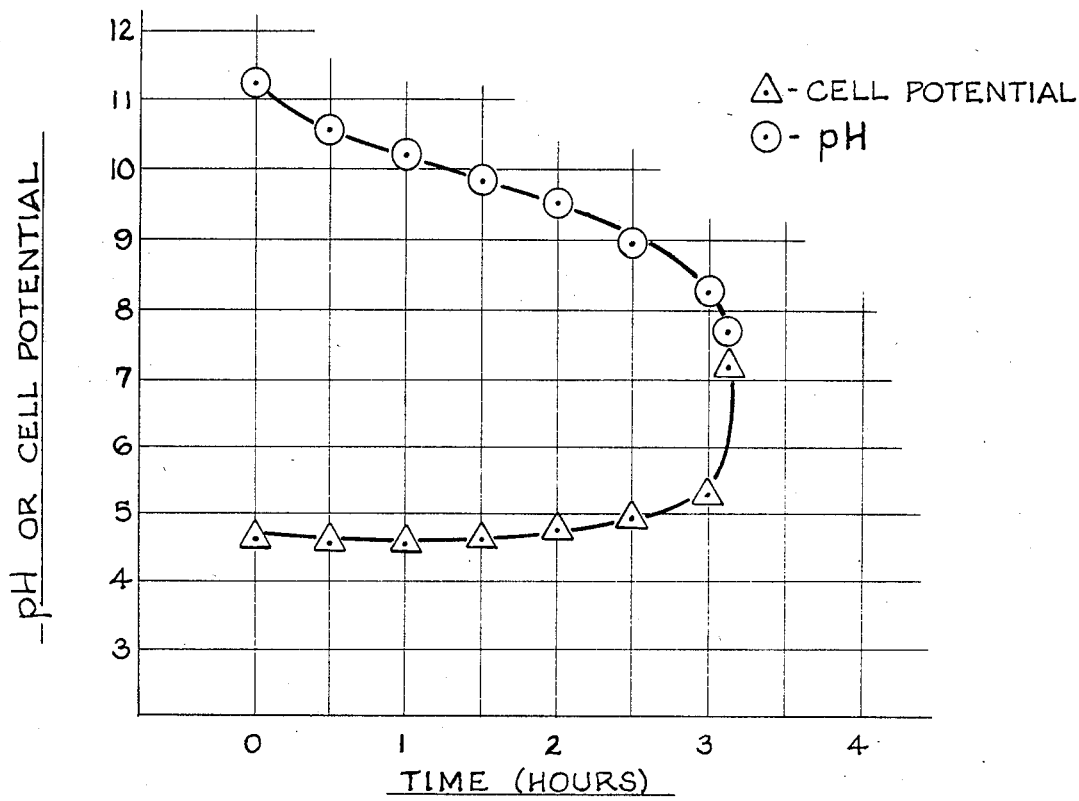
FIG. 4 illustrating the relationship between cell potential and pH as a functional of time—Example 2.

The anolyte was comprised of 2,000 cc of 5 wt % $H_2SO_4$ and was pumped through the anode chamber at 440 cc/min. The catholyte was comprised of 17.10 wt % NaOH and was pumped through the cathode chamber at 500 cc/min. The middle solution was comprised of 90.1 grams of 98% glycine, 48.3 grams of NaOH and 760 grams of deionized water. The flow rate through the middle compartment was 688 cc/min. The voltage of the cell was adjusted to yield a current density of 1.5 amps/in$^2$. Table II gives the parameters measure during the run. These data are used to generate FIG. 4 which gives the relationship between cell potential and pH as a function of time.

The pH, measured as a 10 vol % soution of the process stream in deionized water, was 7.68. This resulted in the transport of 1.44% of the charged glycine into the catholyte stream. Sodium conversion was 96.5%, preparing 19.84 wt % NaOH as final catholyte.

TABLE II

| Time | Levels (cc) | | | Cell | | Flow Rates (cc/min) | | | Anode Potential | |
|---|---|---|---|---|---|---|---|---|---|---|
| hrs. | $H_2SO_4$ | NaGLYC | NaOH | Volts | Amps | $H_2SO_4$ | NaGLYC | NaOH | vs SCE | pH (10/100) |
| 0 | 1700 | 700 | 1150 | 4.71 | 13.5 | 440 | 660 | 416 | 1.45 | 11.24 start |
| 0.5 | | | | 4.70 | " | | | | 1.51 | 10.47 |
| 1.0 | | | | 4.72 | " | | | | 1.52 | 10.10 |
| 1.5 | | | | 4.77 | " | | | | 1.52 | 9.77 |
| 2.0 | | | | 4.84 | " | | | | 1.53 | 9.45 |
| 2.5 | | | | 4.99 | " | | | | 1.53 | 9.05 |
| 3.0 | | | | 5.49 | " | | | | 1.53 | 8.22 |
| 3.166 | | | | 8.30 | " | | | | 1.53 | 6.87 |

EXAMPLE 3

Figure 5:
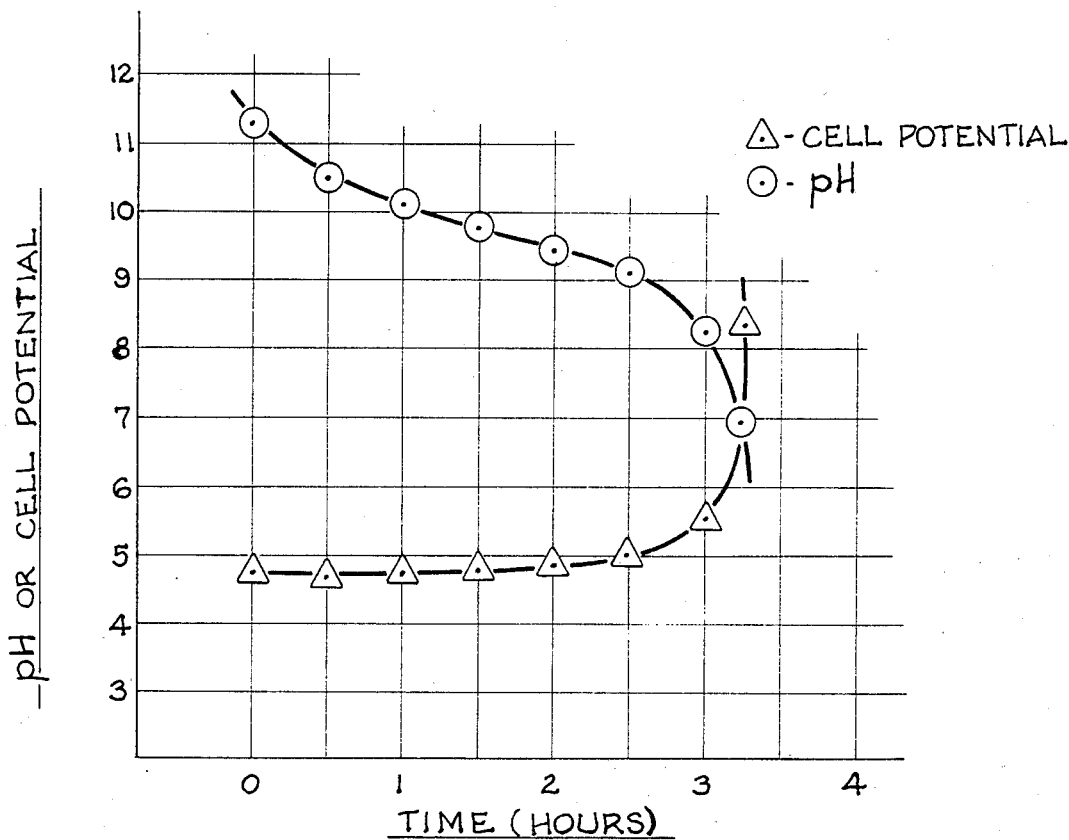
FIG. 5 illustrating the relationship between cell potential and pH as a functional of time—Example 3.
Figure 6:
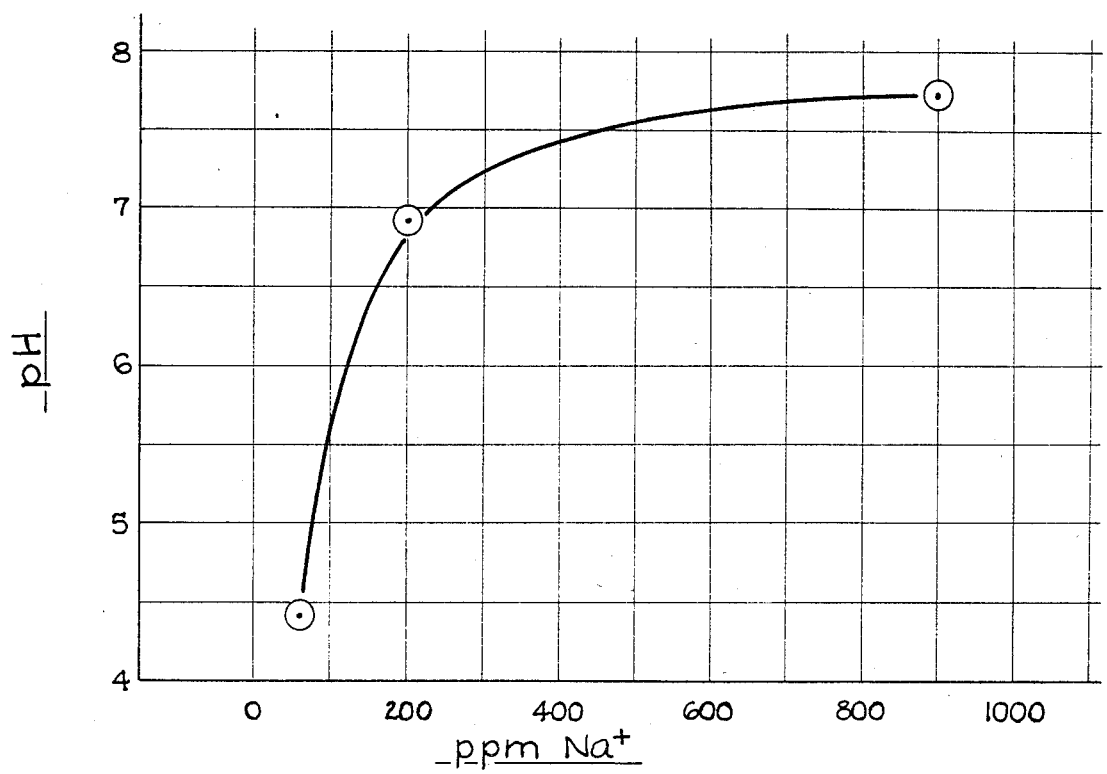
FIG. 6 illustrating a composite of pH versus sodium ion concentration for Examples 1, 2 and 3.
Figure 7:
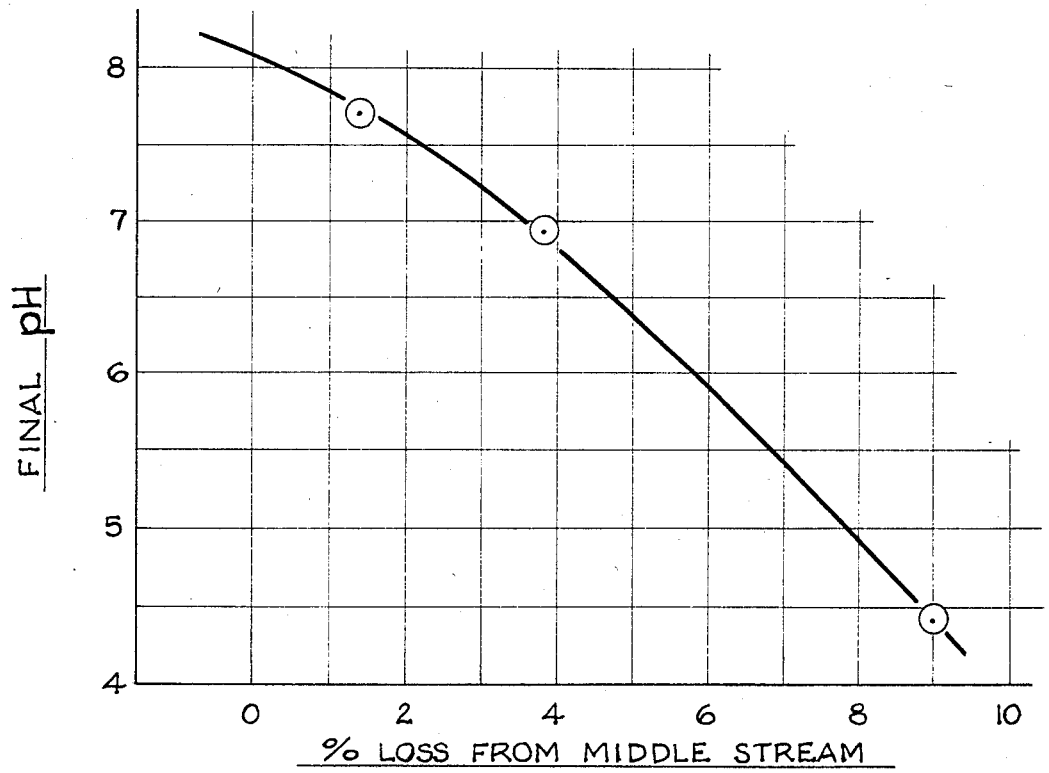
FIG. 7 illustrating a composite of pH versus loss of glycine to catholyte stream for Examples 1, 2 and 3.

The anolyte was comprised of 2,000 cc of 5 wt % $H_2SO_4$ and was pumped through the anode chamber at 440 cc/min. The catholyte was comprised of 16.56 wt % NaOH and was pumped through the cathode chamber at 416 cc/min. The middle solution was comprised of 90.1 grams of 98% glycine, 48.3 grams of NaOH and 760 grams of deionized water. The flow rate through the middle compartment was 660 cc/min. The voltage of the cell was adjusted to yield a current density of 1.5 amps/in$^2$. Table III gives the parameters measured during the run. These data are used to generate FIG. 5 which gives the relationship between cell potential and pH as a function of time.

The pH, measured as a 10 vol % solution of the process stream in deionized water, was 6.89. This resulted in the transport of 3.81% of the charged glycine into the catholyte stream. Sodium conversion was 99.3%, preparing 18.61 wt % NaOH as final catholyte.

TABLE III

| Time | Levels (cc) | | | Cell | | Flow Rates (cc/min) | | | Anode Potential | |
|---|---|---|---|---|---|---|---|---|---|---|
| hrs. | $H_2SO_4$ | NaGLYC | NaOH | Volts | Amps | $H_2SO_4$ | NaGLYC | NaOH | vs SCE | pH (10/100) |
| 0 | 1800 | 2600 | 1000 | 5.42 | 13.5 | 560 | 720 | 740 | 1.35 | 11.16 start |
| 0.5 | | | | 5.15 | " | | | | 1.44 | 10.36 |
| 1.0 | | | | 5.07 | " | | | | 1.45 | 10.05 |
| 1.5 | | | | 5.07 | " | | | | 1.46 | 9.77 |
| 2.0 | | | | 5.14 | " | | | | 1.47 | 9.51 |
| 2.5 | 1700 | 2600 | 1100 | 5.26 | " | | | | 1.47 | 9.15 |
| 3.0 | | | | 5.92 | " | | | | 1.50 | 8.62 |
| 3.166 | | | | 8.44 | " | | | | 1.47 | 4.39 |

EXAMPLE 4

The anolyte was comprised of 500 cc of 5 wt % $H_2SO_4$ and was pumped through the anode chamber at 614 cc/min. The catholyte was comprised of 7.96 wt % KOH and was pumped through the cathode chamber at 470 cc/min. The middle solution is comprised of 74.98 grams of 98% glycine, 138.17 grams of $K_2CO_3$, and 500 grams of deionized water. The flow rate through the middle compartment was 300 cc/min. The voltage of the cell was adjusted to yield a current density of 1.0 amps/in$^2$. A nitrogen sparge was utilized to aid in the removal of $CO_2$ from the middle stream.

TABLE IV

| Time | Levels (cc) | | | Cell | | Flow Rates (cc/min) | | | Electrodes vs. SCE | | pH (10/100) |
|---|---|---|---|---|---|---|---|---|---|---|---|
| | $H_2SO_4$ | KGLY | KOH | Volts | Amps | $H_2SO_4$ | KGLY | KOH | + | − | |
| 0 | 500 | 550 | 600 | 5.80 | 9.0 | 614 | 300 | 470 | 1.43 | — | Start |
| 2.0 | 500 | 495 | 600 | 5.06 | 9.0 | | | | 1.53 | — | pH = 8.76 |
| 3.5 | | | | 4.58 | 9.0 | | | | 1.53 | — | pH = 9.44 |
| 4.5* | | | | 4.59 | 9.0 | | | | 1.54 | — | pH = 8.59 Shutdown 13.95 wt % KOH |
| 20.75 | <500 | 425 | 600 | 5.89 | 9.0 | | | | 1.52 | — | Restart pH = 8.13 |
| | added 200 cc DI $H_2O$ to anolyte | | | | | | | | | | |
| 21.75 | | | | 7.90 | 9.0 | | | | 1.49 | — | pH = 3.94 Shutdown |

*Recycle solutions at 0.25 amps until restoration of 9.0 amps at 20.75 hours 14 gram catholyte sample for analysis

We claim:

1. A method for preparing monobasic amino acids from their corresponding salts which consists essentially of carrying out an electrolytic conversion of said salt to said free acid in a central compartment formed essentially between a first sulfonic acid functional cation permselective membrane facing the anode and a second membrane facing the cathode which is a cation permselective fluorocarbon having sulfonic and/or carboxylic acid functional groups, said membrane being spaced 1 mm or less apart.

2. In the process of claim 1 wherein a fluorocarbon membrane faces the anode.

3. In the process of claim 1 wherein a hydrocarbon membrane faces the anode.

4. In the process of claim 1 wherein the conversion of salt in the center compartment is >50%.

5. In the process of claim 4 wherein the conversion of salt in the center compartment is >99%.

6. In the process of claim 1 wherein the concentration of alkali metal hydroxide in the catholyte compartment is greater than 10%.

7. In the process of claim 1 wherein the alkali metal hydroxide is sodium or potassium hydroxide.

8. In the process of claims 1-7 wherein said monobasis amino acid is glycine.

* * * * *